(12) United States Patent
Kemmerer et al.

(10) Patent No.: US 12,058,959 B2
(45) Date of Patent: Aug. 13, 2024

(54) REEL ASSEMBLY OF AN AGRICULTURAL HEADER

(71) Applicant: CNH Industrial America LLC, New Holland, PA (US)

(72) Inventors: Benjamin David Kemmerer, Hamburg, PA (US); Blaine Robert Noll, Fleetwood, PA (US); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 490 days.

(21) Appl. No.: 17/422,821

(22) PCT Filed: Jan. 24, 2020

(86) PCT No.: PCT/US2020/015025
§ 371 (c)(1),
(2) Date: Jul. 14, 2021

(87) PCT Pub. No.: WO2020/154644
PCT Pub. Date: Jul. 30, 2020

(65) Prior Publication Data
US 2022/0071090 A1    Mar. 10, 2022

Related U.S. Application Data

(60) Provisional application No. 62/796,367, filed on Jan. 24, 2019.

(51) Int. Cl.
*A01D 57/04* (2006.01)
*A01D 41/14* (2006.01)

(52) U.S. Cl.
CPC ........... *A01D 57/04* (2013.01); *A01D 41/144* (2013.01)

(58) Field of Classification Search
CPC ....... A01D 41/144; A01D 57/04; A01D 57/02
See application file for complete search history.

(56) References Cited

U.S. PATENT DOCUMENTS

| 2,873,567 | A | 2/1959 | Vogelaar et al. |
| 3,722,194 | A | 3/1973 | Halls |

(Continued)

FOREIGN PATENT DOCUMENTS

| CA | 2876686 A1 * | 6/2016 | ............ A01D 45/00 |
| DE | 102014009161 | 12/2015 | |

(Continued)

OTHER PUBLICATIONS

PCT Application No. PCT/US2020/015025 Invitation to Pay Additional Fees mailed Apr. 29, 2020, 11 pgs.

*Primary Examiner* — Alicia Torres
*Assistant Examiner* — Ashley A Kaercher
(74) *Attorney, Agent, or Firm* — Peter K. Zacharias; Rebecca L. Henkel; Rickard K. DeMille (57) ABSTRACT

A reel assembly of an agricultural header includes a first arm configured to support a reel of the reel assembly and a first pivot joint configured to pivotally couple the first arm to a frame of the agricultural header. The first pivot joint is configured to enable the first arm to pivot about a first local lateral axis of the agricultural header and about a longitudinal axis of the agricultural header relative to the frame. In addition, the reel assembly includes a second arm configured to support the reel and a second pivot joint configured to pivotally couple the second arm to the frame. The second pivot joint is configured to enable the second arm to pivot about a second local lateral axis of the agricultural header relative to the frame and to substantially block pivoting of the second arm about the longitudinal axis relative to the frame.

20 Claims, 7 Drawing Sheets

(56) References Cited

U.S. PATENT DOCUMENTS

| | | | |
|---|---|---|---|
| 4,038,810 A * | 8/1977 | Williams | A01D 57/02 |
| | | | 56/220 |
| 4,972,661 A | 11/1990 | Roden | |
| 6,138,447 A | 10/2000 | Stivers et al. | |
| 7,426,817 B2 | 9/2008 | Coers | |
| 7,992,372 B1 * | 8/2011 | Coers | A01D 41/14 |
| | | | 56/153 |
| 8,176,716 B2 | 5/2012 | Coers et al. | |
| 2007/0204585 A1 * | 9/2007 | Lovett | A01D 61/002 |
| | | | 56/15.8 |
| 2016/0183465 A1 * | 6/2016 | Honey | A01D 61/002 |
| | | | 56/226 |
| 2018/0303029 A1 | 10/2018 | Wilbert et al. | |

FOREIGN PATENT DOCUMENTS

| | | | | |
|---|---|---|---|---|
| EP | 0789990 | | 8/1997 | |
| EP | 2422608 A1 * | | 2/2012 | A01D 57/02 |
| EP | 3420799 | | 1/2019 | |

\* cited by examiner

REEL ASSEMBLY OF AN AGRICULTURAL HEADER

CROSS-REFERENCE TO RELATED APPLICATIONS

This application is a national stage of PCT Application No. PCT/US2020/015025, entitled "Reel Assembly of an Agricultural Header", filed Jan. 24, 2020, which claims priority from and the benefit of U.S. Provisional Application Ser. No. 62/796,367, entitled "Reel Assembly of an Agricultural Header," filed Jan. 24, 2019. Each of the foregoing applications is hereby incorporated by reference in its entirety.

BACKGROUND

The present disclosure relates generally to a reel assembly of an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system. Certain headers include a reel assembly configured to direct the crops cut by the cutter bar assembly toward the belt(s), thereby substantially reducing the possibility of the cut crops falling onto the surface of the field.

Reel assemblies typically include a reel having multiple fingers extending from a central framework. The central framework is driven to rotate such that the fingers move in a circular pattern. The fingers are configured to engage the cut crops, thereby urging the cut crops to move toward the belt(s). The reel is typically supported by multiple arms extending from a frame of the header. In certain embodiments, the reel assembly may include one or more actuators configured to drive the arms to rotate, thereby adjusting the position of the reel. Certain frames have a center section and a wing section pivotally coupled to the center section. The reel may extend across the center section and the wing section to urge cut crops toward respective belt(s). To enable the reel to flex with the frame, the reel may include a first section, a second section, and a joint configured to enable the second section to pivot relative to the first section. The first section of the reel may be supported by an arm coupled to the center section of the frame, and the second section of the reel may be supported by an arm coupled to the wing section of the frame. Because the distance between the arms varies as the frame flexes, certain reels include a telescoping assembly configured to enable the first and second sections of the reel to move relative to one another. Unfortunately, the telescoping assembly is complex and costly to manufacture, and time-consuming to maintain.

SUMMARY

In certain embodiments, a reel assembly of an agricultural header includes a first arm configured to support a reel of the reel assembly and a first pivot joint configured to pivotally couple the first arm to a frame of the agricultural header. The first pivot joint is configured to enable the first arm to pivot about a first local lateral axis of the agricultural header and about a longitudinal axis of the agricultural header relative to the frame. In addition, the reel assembly includes a second arm configured to support the reel of the reel assembly and a second pivot joint configured to pivotally couple the second arm to the frame. The second pivot joint is configured to enable the second arm to pivot about a second local lateral axis of the agricultural header relative to the frame and to substantially block pivoting of the second arm about the longitudinal axis relative to the frame.

BRIEF DESCRIPTION

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
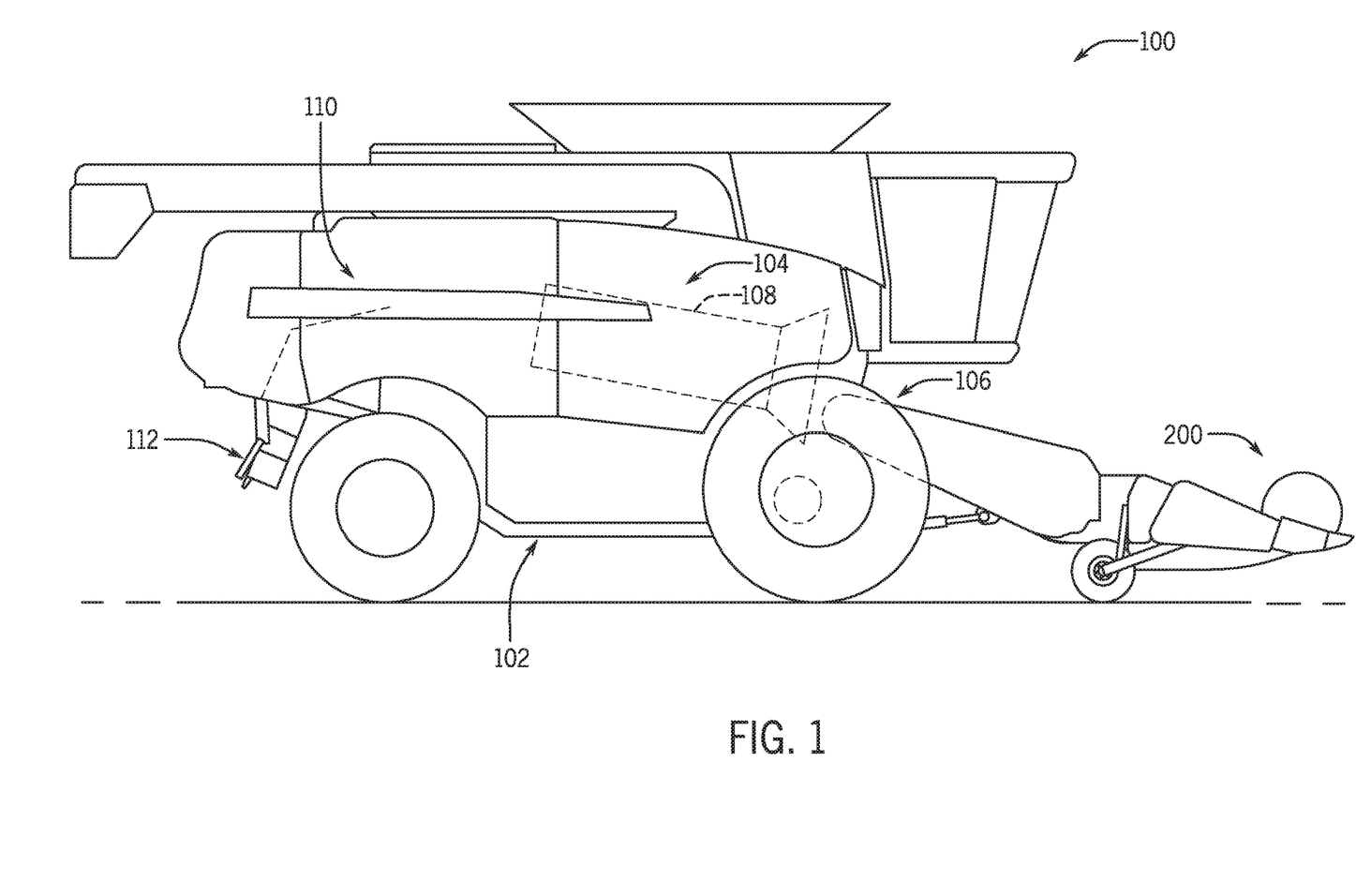
FIG. 1 is a side view of an embodiment of an agricultural harvester having a header.

Turning to the drawings, FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. The cutter bar assembly is configured to flex along a width of the header to enable the cutter bar assembly to substantially follow the contours of the field. The cutter bar assembly is supported by multiple arms distributed along the width of the header. Each arm is pivotally mounted to a frame of the header, thereby enabling the cutter bar assembly to flex. To increase the flexibility of the cutter bar assembly, the frame may be divided into multiple sections that are pivotally coupled to one another. For example, the frame may include a center section, a first wing section positioned on a first lateral side of the center section, and a second wing section positioned on a second lateral side of the center section, opposite the first lateral side. The first wing section and the second wing section may each be pivotally coupled to the center section by a respective pivot joint. As a result, a flexible frame is formed, thereby increasing the flexibility of the cutter bar assembly.

The header 200 includes a reel assembly configured to urge crops cut by the cutter bar assembly to belts that convey the cut crops toward the inlet 106 of the agricultural crop processing system 104. As discussed in detail below, the reel assembly includes a reel having multiple fingers extending from a central framework. The central framework is driven to rotate such that the fingers engage the cut crops and urge the cut crops toward the belts. To enable the reel to flex with the header frame, the reel may include multiple sections coupled to one another by pivot joints. For example, the reel may include a center section (e.g., positioned forward of the center section of the header frame), a first wing section (e.g., positioned forward of the first wing section of the header frame), and a second wing section (e.g., positioned forward of the second wing section of the header frame). The first wing section and the second wing section of the reel may each be coupled to the center section of the reel by a respective pivot joint. As a result, a flexible reel is formed, thereby enabling the reel to flex with the header frame.

The first wing section of the reel may be supported by an arm coupled to the first wing section of the frame, and the second wing section of the reel may be supported by an arm coupled to the second wing section of the frame, and the center section of the reel may be supported by arms coupled to the center section of the frame. In certain embodiments, a first arm is configured to support the reel on the frame (e.g., support the first wing section of the reel on the first wing section of the frame), and a second arm is configured to support the reel on the frame (e.g., support the center section of the reel on the center section of the frame). In such embodiments, a first pivot joint is configured to pivotally couple the first arm to the frame, and a second pivot joint is configured to pivotally couple the second arm to the frame. The first pivot joint is configured to enable the first arm to pivot about a first local lateral axis of the agricultural header (e.g., a lateral axis of the first wing section of the frame) and about a longitudinal axis of the agricultural header relative to the frame. In addition, the second pivot joint is configured to enable the second arm to pivot about a second local lateral axis of the agricultural header (e.g., a lateral axis of the center section of the frame) relative to the frame and to substantially block pivoting of the second arm about the longitudinal axis relative to the frame. Because the first pivot joint enables the first arm to pivot about the longitudinal axis, the distance between the first arm/reel connection point and the second arm/reel connection point may be substantially maintained as the header frame flexes (e.g., as the first wing section of the header frame pivots relative to the center section of the header frame). Accordingly, a telescoping assembly configured to enable the reel sections to translate relative to one another (e.g., to compensate for variable spacing between the reel/arm connection points) may be obviated. As a result, the cost and complexity associated with manufacturing the header may be substantially reduced. In addition, maintenance operations on the header may be substantially reduced due to the absence of the telescoping assembly.

Figure 2:
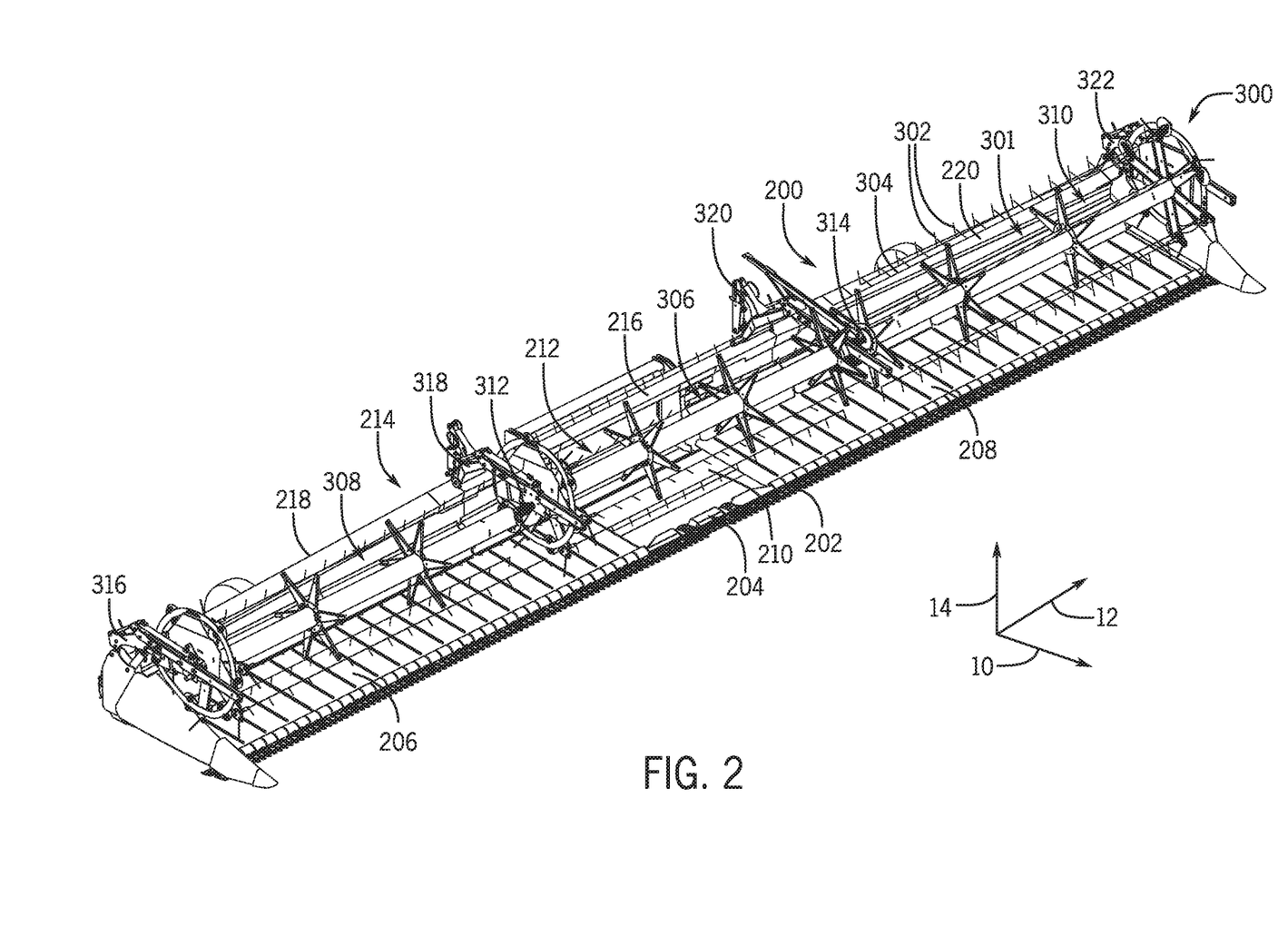
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). The cutter bar assembly includes a blade support, a stationary guard assembly, and a moving blade assembly. The moving blade assembly is fixed to the blade support (e.g., above the blade support along a vertical axis 14 of the header 200), and the blade support/moving blade assembly is driven to oscillate relative to the stationary guard assembly. In the illustrated embodiment, the blade support/moving blade assembly is driven to oscillate by a driving mechanism 204 positioned at the lateral center of the header 200. However, in other embodiments, the blade support/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10.

In the illustrated embodiment, the crops cut by the cutter bar assembly 202 are directed toward the belts by a reel assembly 300, thereby substantially reducing the possibility of the cut crops falling onto the surface of the field. The reel assembly 300 includes a reel 301 having multiple fingers 302 extending from a central framework 304. The central framework 304 is driven to rotate such that the fingers 302 move (e.g., in a circular pattern). The fingers 302 are configured to engage the cut crops and urge the cut crops toward the belts. The cut crops that contact the top surface of the lateral belts are driven laterally inwardly to the longitudinal belt due to the movement of the lateral belts. In addition, cut crops that contact the longitudinal belt 210 and the cut crops provided to the longitudinal belt by the lateral belts are driven rearwardly along the longitudinal axis 10 due to the movement of the longitudinal belt 210. Accordingly, the belts move the cut agricultural crops through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). The cutter bar assembly 202 is supported by multiple arm assemblies distributed along the width of the header 200 (e.g., along the lateral axis 12 of the header 200). Each arm assembly is mounted to a frame 214 of the header 200 and includes an arm configured to rotate and/or move along the vertical axis 14 relative to the frame. Each rotatable/movable arm is coupled to the cutter bar assembly 202, thereby enabling the cutter bar assembly 202 to flex during operation of the harvester. The flexible cutter bar assembly may follow the contours of the field, thereby enabling the cutting height (e.g., the height at which each crop is cut) to be substantially constant along the width of the header 200 (e.g., the extent of the header 200 along the lateral axis 12).

In the illustrated embodiment, the frame 214 is divided into multiple sections that are pivotally coupled to one another, thereby increasing the flexibility of the cutter bar assembly 202. As illustrated, the frame 214 includes a center section 216, a first wing section 218 positioned on a first lateral side of the center section 216 (e.g., along the lateral axis 12), and a second wing section 220 positioned on a second lateral side of the center section 216, opposite the first lateral side (e.g., along the lateral axis 12). The first wing section 218 and the second wing section 220 are each pivotally coupled to the center section 216 by a respective pivot joint. As a result, a flexible frame 214 is formed, thereby increasing the flexibility of the cutter bar assembly 202.

In the illustrated embodiment, the reel 301 includes multiple sections coupled to one another by pivot joints to enable the reel 301 to flex with the header frame. As illustrated, the reel 301 includes a center section 306 (e.g., positioned forward of the center section 216 of the header frame 214 along the longitudinal axis 10), a first wing section 308 (e.g., positioned forward of the first wing section 218 of the header frame 214 along the longitudinal axis 10), and a second wing section 310 (e.g., positioned forward of the second wing section 220 of the header frame 214 along the longitudinal axis 10). The first wing section 308 is pivotally coupled to the center section 306 by a first pivot joint 312, and the second wing section 310 is pivotally coupled to the center section 306 by a second pivot joint 314. As a result, a flexible reel 301 is formed, thereby enabling the reel 301 to flex with the header frame 214.

In the illustrated embodiment, the first wing section 308 of the reel 301 is supported by a first arm 316 coupled to the first wing section 218 of the frame 214, the center section 306 of the reel 301 is supported by a second arm 318 and a third arm 320 each coupled to the center section 216 of the frame 214, and the second wing section 310 of the reel 301 is supported by a fourth arm 322 coupled to the second wing section 220 of the frame 214. As discussed in detail below, a first pivot joint pivotally couples the first arm 316 to the frame 214, and a second pivot joint pivotally couples the second arm 318 to the frame 214. The first pivot joint is configured to enable the first arm 316 to pivot about a first local lateral axis of the agricultural header 200 (e.g., a lateral axis of the first wing section 218 of the frame 214) and about the longitudinal axis 10 relative to the frame 214. In addition, the second pivot joint is configured to enable the second arm 318 to pivot about a second local lateral axis of the agricultural header 200 (e.g., a lateral axis of the center section 216 of the frame 214) relative to the frame 214 and to substantially block pivoting of the second arm 318 about the longitudinal axis 10 relative to the frame 214. In certain embodiments, an actuator is coupled to each arm and configured to drive the arm to rotate about the respective local lateral axis, thereby controlling a position of the reel 301 relative to the frame 214 along the vertical axis 214 (e.g., to control engagement of the fingers of the reel with the cut agricultural crops).

Because the first pivot joint enables the first arm 316 to pivot about the longitudinal axis 10, the distance between the first arm/reel connection point and the second arm/reel connection point may be substantially maintained as the header frame 214 flexes (e.g., as the first wing section 218 of the header frame 214 pivots relative to the center section 216 of the header frame 214). Accordingly, a telescoping assembly configured to enable the reel sections to translate relative to one another (e.g., to compensate for variable spacing between the reel/arm connection points) may be obviated. As a result, the cost and complexity associated with manufacturing the header may be substantially reduced. In addition, maintenance operations on the header may be substantially reduced due to the absence of the telescoping assembly.

While the pivot joints of the first and second arms are discussed herein, in certain embodiments, the fourth arm may have the same or similar pivot joint to the first pivot joint of the first arm, and the third arm may have the same or similar pivot joint to the second pivot joint of the second arm. Accordingly, the pivot joint of the fourth arm may enable the fourth arm to pivot about the longitudinal axis. As a result, the distance between the third arm/reel connection point and the fourth arm/reel connection point may be substantially maintained as the header frame flexes (e.g., as the second wing section of the header frame pivots relative to the center section of the header frame). Furthermore, while the illustrated header includes two wings in the illustrated embodiment, in other embodiments, the header may include more or fewer wings (e.g., 1, 2, 3, 4, 5, 6, or more).

Figure 3:
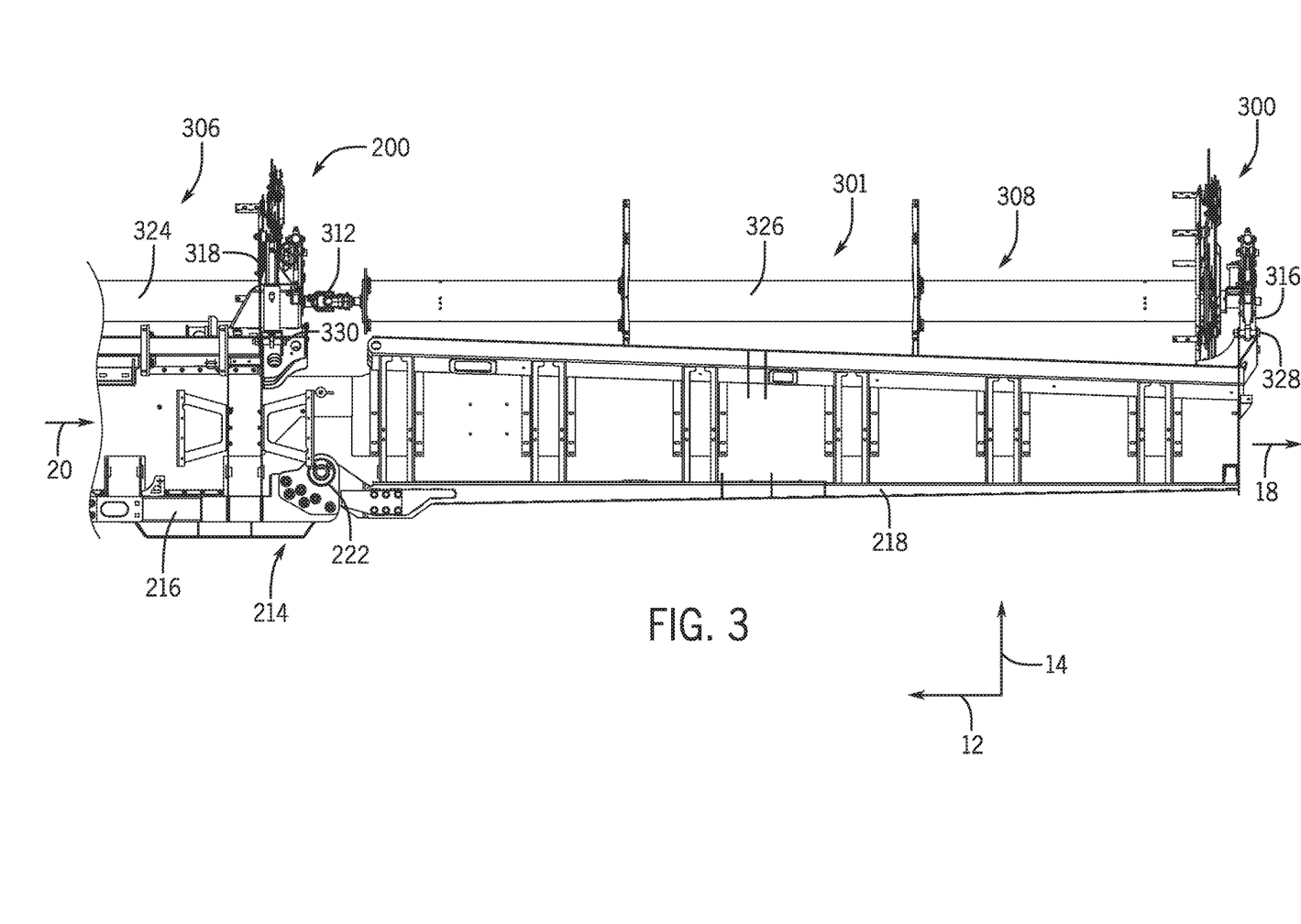
FIG. 3 is a back view of a portion of the header of FIG. 2, in which a wing is in a substantially level position.

FIG. 3 is a back view of a portion of the header 200 of FIG. 2, in which the first wing section 218 of the frame 214 is in a substantially level position. In the illustrated embodiment, the first wing section 218 of the frame 214 is pivotally coupled to the center section 216 of the frame by a pivot joint 222. The pivot joint 222 enables the first wing section 218 to pivot relative to the center section 216 about the longitudinal axis of the header 200. In addition, the pivot joint 222 substantially blocks rotation of the first wing section 218 relative to the center section 216 about the vertical axis. As previously discussed, the pivot joint 222 establishes a flexible frame that enhances the flexibility of the cutter bar assembly.

Furthermore, the center section 306 of the reel 301 has a center shaft 324, and the first wing section 308 of the reel 301 has a first wing shaft 326. As illustrated, the center shaft 324 is pivotally coupled to the first wing shaft 326 by the first pivot joint 312. In the illustrated embodiment, the first pivot joint 312 is a universal joint that enables the first wing shaft 326 to pivot relative to the center shaft 324 about the longitudinal axis and about the vertical axis 14. In addition, the first pivot joint 312 substantially blocks rotation of the first wing shaft 326 relative to the center shaft 324 about the lateral axis 12 (e.g., such that a single drive unit may drive the shafts and the reel, and the framework/fingers coupled to the shafts, to rotate).

As illustrated, the first arm 316 is pivotally coupled to the first wing section 218 of the frame 214 by a first pivot joint 328. The first pivot joint 328 is configured to enable the first arm 316 to pivot about a first local lateral axis 18 of the header 200 and about the longitudinal axis of the header relative to the frame 214. The first local lateral axis 18 corresponds to the lateral axis of the first wing section 218 of the frame 214. Accordingly, while the first wing section 218 of the frame 214 is level with the center section 216 of the frame 214, as illustrated, the first local lateral axis 18 is aligned with the header lateral axis 12. However, as the first wing section 218 of the frame 214 rotates about the pivot joint 222, the angle between the first local lateral axis 18 and the header lateral axis 12 varies.

Furthermore, the second arm 318 is pivotally coupled to the center section 216 of the frame 214 by a second pivot joint 330. The second pivot joint 330 is configured to enable the second arm 318 to pivot about a second local lateral axis 20 of the header 200 relative to the frame 214 and to substantially block pivoting of the second arm 318 about the longitudinal axis relative to the frame 214. The second local lateral axis 20 corresponds to the lateral axis of the center section 216 of the frame 214. Accordingly, the second local lateral axis 20 is aligned with the header lateral axis 12.

Figure 4:
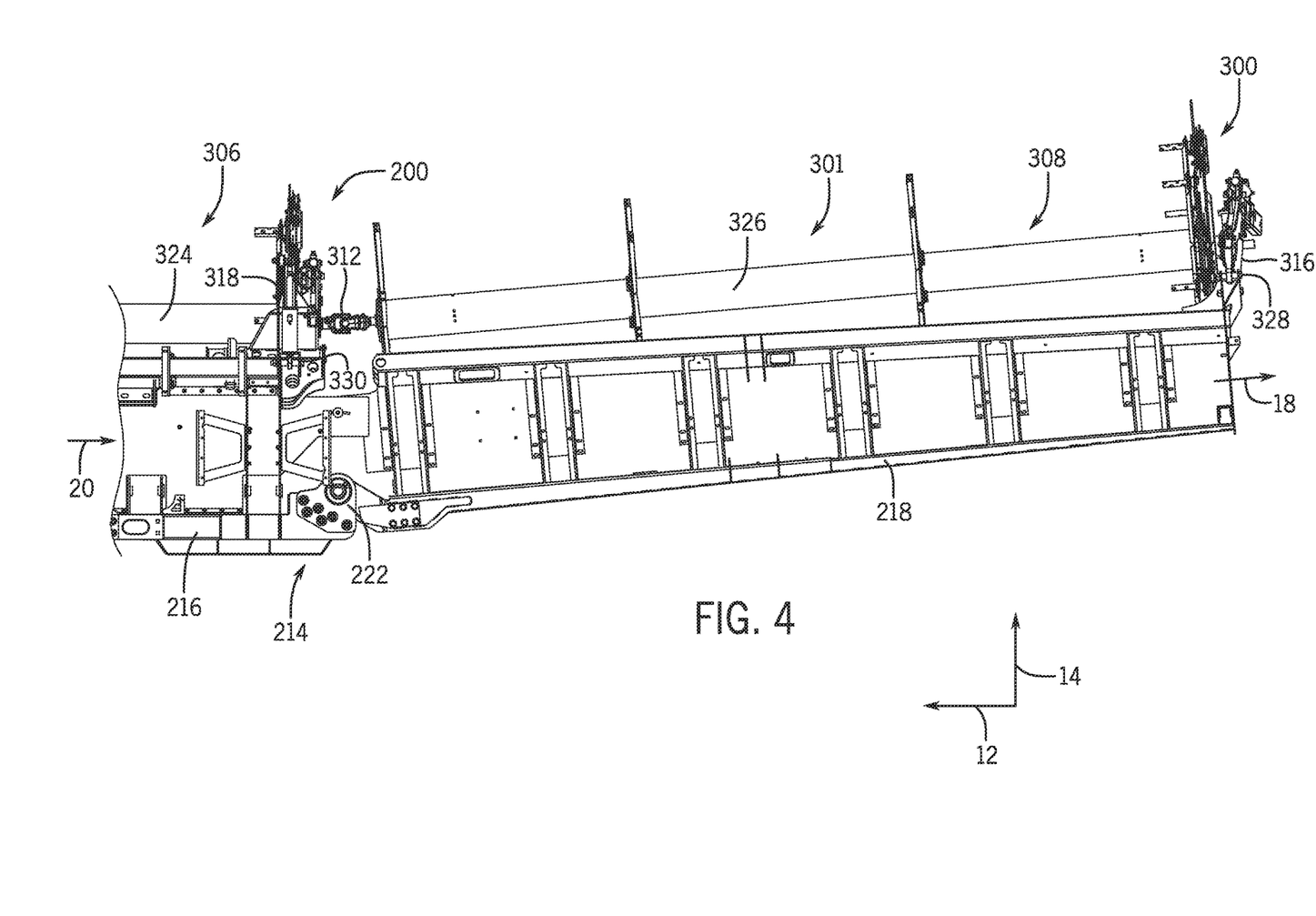
FIG. 4 is a back view of the portion of the header of FIG. 3, in which the wing is in a raised position.

FIG. 4 is a back view of the portion of the header of FIG. 3, in which the first wing section 218 of the frame 214 is in a raised position (e.g., rotated upwardly about the pivot joint 222 relative to the center section 216 of the frame 214). As illustrated, with the first wing section 218 of the frame 214 in the illustrated raised position, the first local lateral axis 18 is angled upwardly relative to the header lateral axis 12. In addition, due to the difference in position between the frame pivot joint 222 and the first shaft pivot joint 312 along the vertical axis 14, upward rotation of the first wing section 218 of the frame 214 causes the first wing shaft 326 to drive the first arm 316 to rotate outwardly about the longitudinal axis, as illustrated. Because the first pivot joint 328 enables the first arm 316 to pivot about the longitudinal axis, a telescoping assembly configured to enable reel sections to translate relative to one another may be obviated. As a result, the cost and complexity associated with manufacturing the header may be substantially reduced. In addition, maintenance operations on the header may be substantially reduced due to the absence of the telescoping assembly.

Figure 5:
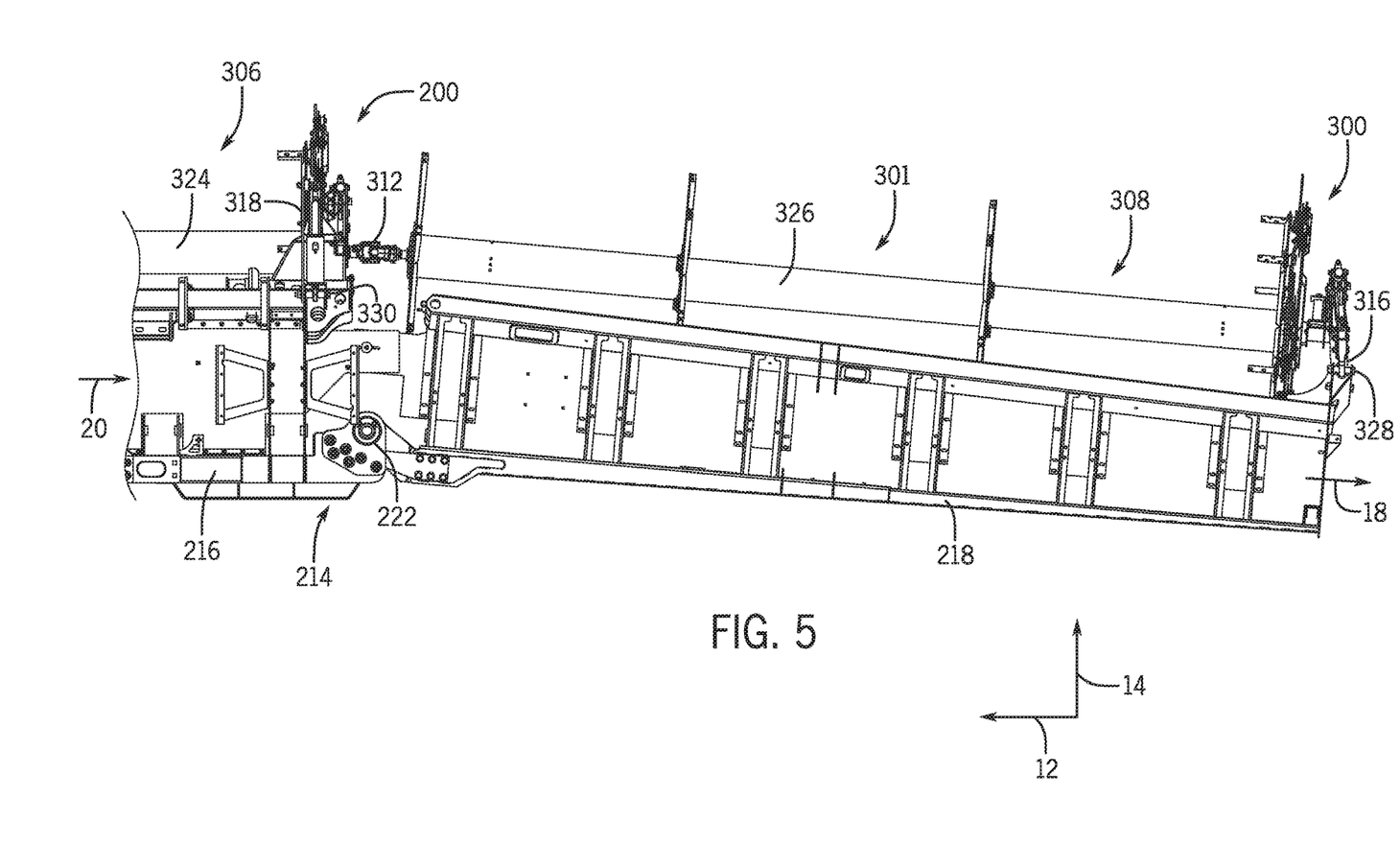
FIG. 5 is a back view of the portion of the header of FIG. 3, in which the wing is in a lowered position.

FIG. 5 is a back view of the portion of the header of FIG. 3, in which the first wing section 218 of the frame 214 is in a lowered position (e.g., rotated downwardly about the pivot joint 222 relative to the center section 216 of the frame 214). As illustrated, with the first wing section 218 of the frame 214 in the illustrated lowered position, the first local lateral axis 18 is angled downwardly relative to the header lateral axis 12. In addition, due to the difference in position between the frame pivot joint 222 and the first shaft pivot joint 312 along the vertical axis 14, downward rotation of the first wing section 218 of the frame 214 causes the first wing shaft 326 to drive the first arm 316 to rotate inwardly about the longitudinal axis, as illustrated. Because the first pivot joint 328 enables the first arm 316 to pivot about the longitudinal axis, a telescoping assembly configured to enable reel sections to translate relative to one another may be obviated. As a result, the cost and complexity associated with manufacturing the header may be substantially reduced. In addition, maintenance operations on the header may be substantially reduced due to the absence of the telescoping assembly.

Figure 6:
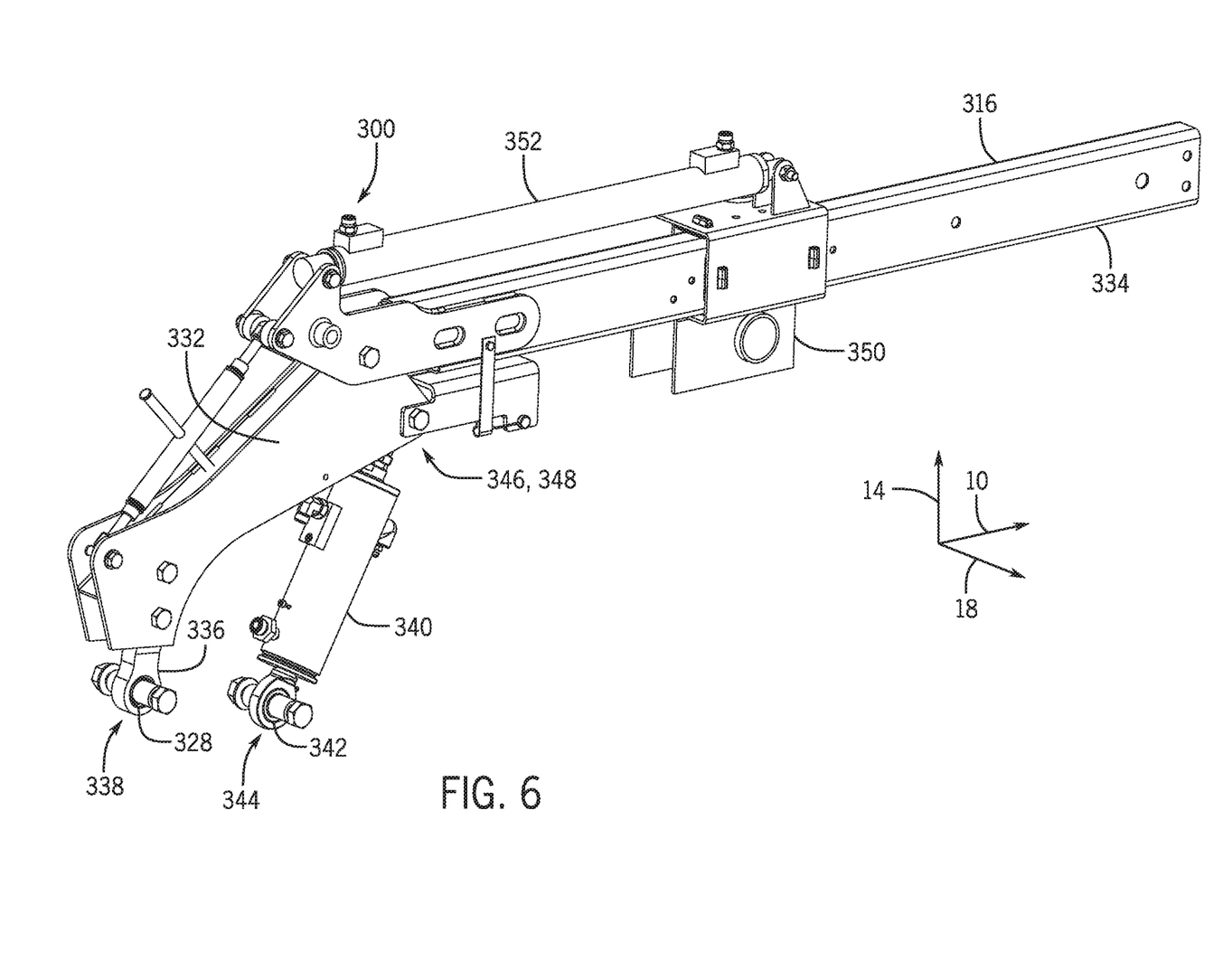
FIG. 6 is a perspective view of an embodiment of an arm that may be employed within the header of FIG. 2, in which the arm is configured to support a reel.

FIG. 6 is a perspective view of an embodiment of the first arm 316, which is configured to support the reel. As previously discussed, the first pivot joint 328 is configured to pivotally couple the first arm 316 to the frame. In addition, the first pivot joint is configured to enable the first arm 316 to pivot about the first local lateral axis 18 and about the longitudinal axis 10 relative to the header frame. In the illustrated embodiment, the first arm 316 has a frame mounting portion 332 and a reel mounting portion 334. The reel mounting portion 334 of the first arm 316 is formed from a tube having a substantially rectangular cross-sectional shape. However, in other embodiments, the reel mounting portion 334 may be formed from any suitable structure. The frame mounting portion 332 and the reel mounting portion 334 may be coupled to one another by any suitable connection system, such as a welded connection, an adhesive connection, or a fastener connection. In further embodiments, the frame mounting portion and the reel mounting portion may be parts of a single integral structure.

As illustrated, the first pivot joint 328 is coupled to the frame mounting portion 332 of the first arm 316 by a mount 336. However, in other embodiments, the first pivot joint 328 may be coupled to the first arm 316 by any other suitable connection system. In the illustrated embodiment, the first pivot joint 328 includes a ball joint 338 configured to enable the first arm 316 to pivot about the first local lateral axis 18 and about the longitudinal axis 10. However, in other embodiments, the first pivot joint may include any other suitable assembly configured to enable the first arm to pivot about the first local lateral axis and about the longitudinal axis. For example, the first pivot joint may include a first single-axis joint configured to enable the first arm to pivot about the first local lateral axis and a second single-axis joint configured to enable the first arm to pivot about the longitudinal axis.

In the illustrated embodiment, the reel assembly 300 includes an actuator 340 coupled to the first arm 316. The actuator 340 is configured to drive the first arm 316 to pivot about the first local lateral axis 18 relative to the frame (e.g., relative to the first wing section of the frame). Accordingly, the actuator 340 may control the position of the reel relative to the frame along the vertical axis 14 by controlling the angle of the first arm 316 relative to the frame. In the illustrated embodiment, the actuator includes a hydraulic cylinder. However, in other embodiments, the actuator may include any suitable device configured to drive the first arm to rotate about the first local lateral axis, such as a linear actuator and/or a pneumatic actuator. Furthermore, in certain embodiments, an actuator may be coupled to at least one other arm of the reel assembly to control the vertical position of the reel relative to the frame.

In the illustrated embodiment, the reel assembly 300 includes a third pivot joint 342 configured to pivotally couple the actuator 340 to the frame. The third pivot joint 342 is configured to enable the actuator 340 to pivot about the first local lateral axis 18 and about the longitudinal axis 10 relative to the frame. In the illustrated embodiment, the third pivot joint 342 includes a ball joint 344. However, in other embodiments, the third pivot joint may include any other suitable assembly configured to enable the actuator to pivot about the first local lateral axis and about the longitudinal axis. For example, the third pivot joint may include a first single-axis joint configured to enable the actuator to pivot about the first local lateral axis and a second single-axis joint configured to enable the actuator to pivot about the longitudinal axis.

Furthermore, the reel assembly 300 includes a fourth pivot joint 346 pivotally coupling the actuator 340 to the first arm 316 (e.g., the frame mounting portion 332 of the first arm 316). The fourth pivot joint 346 is configured to enable the first arm 316 to pivot about the first local lateral axis 18 and about the longitudinal axis 10 relative to the actuator 340. In the illustrated embodiment, the fourth pivot joint 346 includes a ball joint 348. However, in other embodiments, the fourth pivot joint may include any other suitable assembly configured to enable the first arm to pivot about the first local lateral axis and about the longitudinal axis relative to the actuator. For example, the fourth pivot joint may include a first single-axis joint configured to enable the first arm to pivot about the first local lateral axis and a second single-axis joint configured to enable the first to pivot about the longitudinal axis.

In the illustrated embodiment, the reel assembly 300 includes a carriage 350 configured to couple the reel to the first arm 316. The carriage 350 is configured to move along the reel mounting portion 334 of the first arm 316 (e.g., generally along the longitudinal axis 10). In the illustrated embodiment, the reel mounting portion 334 of the first arm 316 is substantially straight, thereby establishing a substantially linear path for the reel along the first arm 316. However, in other embodiments, the reel mounting portion of the first arm may have another suitable shape, such as curved or arcuate, among other suitable shapes. Furthermore, the carriage may include one or more bushings and/or bearings configured to facilitate movement of the carriage along the reel mounting portion of the first arm. In the illustrated embodiment, the reel assembly 300 includes a second actuator 352 configured to drive the carriage 350 along the reel mounting portion 334 of the first arm 316, thereby controlling the position (e.g., longitudinal position) of the reel relative to the frame. While the second actuator 352 includes a hydraulic cylinder in the illustrated embodiment, in other embodiments, the second actuator may include any suitable type of actuator, such as a linear actuator and/or a pneumatic cylinder. In certain embodiments, a carriage and/or second actuator may be coupled to the second arm, the third arm, the fourth arm, or a combination thereof, to facilitate moving the reel relative to the frame.

Figure 7:
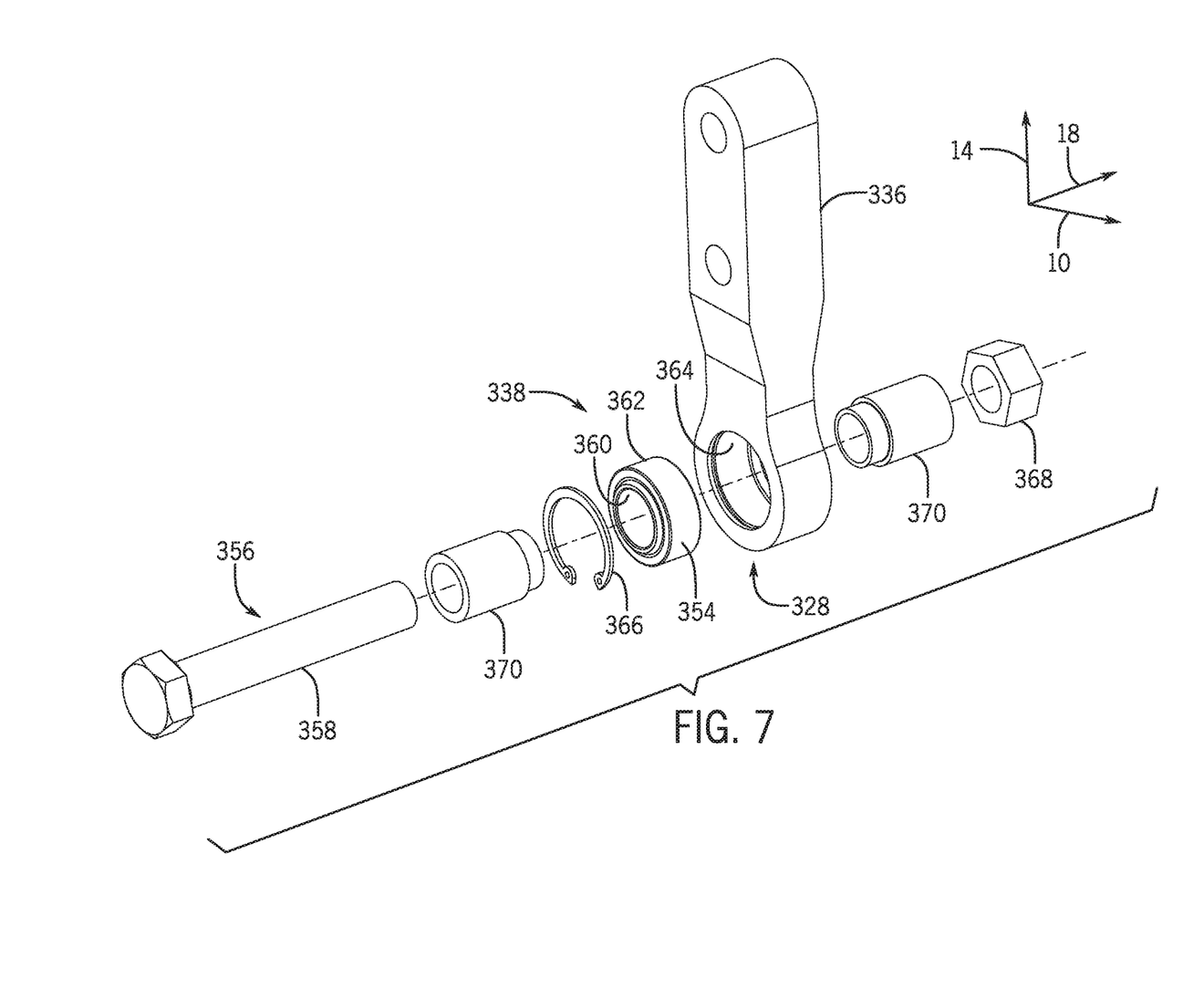
FIG. 7 is an exploded view of an embodiment of a pivot joint configured to pivotally couple the arm of FIG. 6 to an agricultural header frame.

FIG. 7 is an exploded view of an embodiment of the first pivot joint 328 configured to pivotally couple the first arm of FIG. 6 to an agricultural header frame. As previously discussed, the first pivot joint 328 includes a ball joint 338. In the illustrated embodiment, the ball joint 338 includes a rounded bearing assembly 354 and a fastener 356. A shaft 358 of the fastener 356 extends through an opening 360 in the rounding bearing assembly 354, and an outer surface 362 of the rounded bearing assembly 354 is disposed within a cavity 364 of the mount 336. The fastener 356 is configured to couple the mount 336 to the frame of the agricultural header. Interaction between rounded elements within the rounded bearing assembly 354 enables the mount 336 to pivot about the longitudinal axis 10 and about the first local lateral axis 18 relative to the fastener 356/frame. Furthermore, in certain embodiments, interaction between the shaft 358 of the fastener 356 and the rounding bearing assembly 354 may enable the mount 336 to pivot about the first local lateral axis 18. Because the mount 336 is coupled to the first arm, the ball joint 338 enables the first arm to pivot about the longitudinal axis and about the first local lateral axis relative to the frame of the agricultural header.

In the illustrated embodiment, the ball joint 338 includes a clip 366 configured to retain the rounding bearing assembly 354 within the cavity 364. In addition, the ball joint 338 includes a nut 368 configured to engage a threaded end of the fastener 356 to secure the fastener to the frame and to the mount 336. In other embodiments, the fastener may be secured to the frame and to the mount by another suitable retaining element, such as a pin or a clip. Furthermore, in the illustrated embodiment, the first pivot joint 328 includes spacers 370 disposed about the shaft 358 of the fastener 356 and configured to substantially center the rounded bearing assembly 354 on the fastener 356. While a particular configuration of a ball joint is described above, the first pivot joint may include another suitable ball joint configuration in other embodiments. In addition, the third pivot joint and/or the fourth pivot joint may include a ball joint having the same structure as the ball joint described above, or the third pivot joint and/or the fourth pivot joint may include a ball joint having another suitable structure.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A reel assembly of an agricultural header, comprising:
   a first arm configured to support a reel of the reel assembly;

a first pivot joint configured to pivotally couple the first arm to a frame of the agricultural header, wherein the first pivot joint is configured to enable the first arm to pivot about a first local lateral axis of the agricultural header and about a longitudinal axis of the agricultural header relative to the frame;

a second arm configured to support the reel of the reel assembly; and a second pivot joint configured to pivotally couple the second arm to the frame, wherein the second pivot joint is configured to enable the second arm to pivot about a second local lateral axis of the agricultural header relative to the frame and to substantially block pivoting of the second arm about the longitudinal axis relative to the frame.

2. The reel assembly of claim 1, wherein the first pivot joint comprises a ball joint.

3. The reel assembly of claim 1, comprising an actuator coupled to the first arm, wherein the actuator is configured to drive the first arm to pivot about the first local lateral axis relative to the frame.

4. The reel assembly of claim 3, comprising a third pivot joint configured to pivotally couple the actuator to the frame, wherein the third pivot joint is configured to enable the actuator to pivot about the first local lateral axis and about the longitudinal axis relative to the frame.

5. The reel assembly of claim 4, wherein the third pivot joint comprises a ball joint.

6. The reel assembly of claim 3, comprising a fourth pivot joint pivotally coupling the actuator to the first arm, wherein the fourth pivot joint is configured to enable the first arm to pivot about the first local lateral axis and about the longitudinal axis relative to the actuator.

7. The reel assembly of claim 1, comprising:
a carriage configured to couple to the reel and to move along the first arm; and
a second actuator configured to drive the carriage to move along the first arm.

8. An agricultural header, comprising:
a frame having a center section, a wing section, and a pivot assembly configured to enable the wing section to rotate about a longitudinal axis of the agricultural header relative to the center section; and
a reel assembly, comprising:
a first arm configured to support a reel of the reel assembly; and
a first pivot joint pivotally coupling the first arm to the wing section, wherein the first pivot joint is configured to enable the first arm to pivot about a first local lateral axis of the wing section and about the longitudinal axis of the agricultural header relative to the wing section.

9. The agricultural header of claim 8, wherein the reel assembly comprises a second arm configured to support the reel.

10. The agricultural header of claim 9, wherein the reel assembly comprises a second pivot joint pivotally coupling the second arm to the center section, wherein the second pivot joint is configured to enable the second arm to pivot about a second local lateral axis of the center section relative to the center section and to substantially block pivoting of the second arm about the longitudinal axis relative to the center section.

11. The agricultural header of claim 8, wherein the first pivot joint comprises a ball joint.

12. The agricultural header of claim 8, wherein the reel assembly comprises an actuator coupled to the first arm, and the actuator is configured to drive the first arm to pivot about the first local lateral axis relative to the wing section.

13. The agricultural header of claim 12, wherein the reel assembly comprises a third pivot joint pivotally coupling the actuator to the wing section, and the third pivot joint is configured to enable the actuator to pivot about the first local lateral axis and about the longitudinal axis relative to the wing section.

14. The agricultural header of claim 13, wherein the third pivot joint comprises a ball joint.

15. The agricultural header of claim 12, wherein the reel assembly comprises a fourth pivot joint pivotally coupling the actuator to the first arm, and the fourth pivot joint is configured to enable the first arm to pivot about the first local lateral axis and about the longitudinal axis relative to the actuator.

16. An agricultural header, comprising:
a frame;
a reel assembly, comprising:
a reel;
a first arm configured to support the reel;
a first pivot joint pivotally coupling the first arm to the frame, wherein the first pivot joint is configured to enable the first arm to pivot about a first local lateral axis of the agricultural header and about a longitudinal axis of the agricultural header relative to the frame;
a second arm configured to support the reel; and
a second pivot joint pivotally coupling the second arm to the frame, wherein the second pivot joint is configured to enable the second arm to pivot about a second local lateral axis of the agricultural header relative to the frame and to substantially block pivoting of the second arm about the longitudinal axis relative to the frame.

17. The agricultural header of claim 16, wherein the first pivot joint comprises a ball joint.

18. The agricultural header of claim 16, wherein the reel assembly comprises an actuator coupled to the first arm, and the actuator is configured to drive the first arm to pivot about the first local lateral axis relative to the frame.

19. The agricultural header of claim 18, wherein the reel assembly comprises a third pivot joint pivotally coupling the actuator to the frame, and the third pivot joint is configured to enable the actuator to pivot about the first local lateral axis and about the longitudinal axis relative to the frame.

20. The agricultural header of claim 18, wherein the reel assembly comprises a fourth pivot joint pivotally coupling the actuator to the first arm, and the fourth pivot joint is configured to enable the first arm to pivot about the first local lateral axis and about the longitudinal axis relative to the actuator.

* * * * *